United States Patent

Hoer

[15] 3,701,057
[45] Oct. 24, 1972

[54] BROAD-BAND LUMPED-ELEMENT DIRECTIONAL COUPLER

[72] Inventor: Cletus A. Hoer, Boulder, Colo.
[73] Assignee: The United States of America as represented by the Secretary of the Navy
[22] Filed: May 20, 1971
[21] Appl. No.: 145,153

[52] U.S. Cl. ................................ 333/10, 333/97 R
[51] Int. Cl. .......................................... H01p 5/14
[58] Field of Search .................................. 333/10

[56] References Cited

UNITED STATES PATENTS 2,588,390  3/1952  Jones ..................... 333/10 X
3,550,042  12/1970  Werlau ..................... 333/10

*Primary Examiner*—Paul L. Gensler
*Attorney*—R. S. Sciascia and Thomas O. Watson, Jr.

[57] ABSTRACT

A broad-band lumped element directional coupler for measuring either the forward or reflected power in a coaxial transmission line. A resistive voltage divider is coupled to the center conductor of a transmission line with a capacitor to keep the phase of the voltage sampling circuit equal to the phase of the current sampling circuit. Capacitors shunting the resistors make the voltage ratio of the resistive voltage divider independent of frequency over a large frequency range. Directivity greater than 50 dB is achieved over a large frequency range for coupling ratios of 30, 40 and 50 dB.

10 Claims, 6 Drawing Figures

INVENTOR.
CLETUS A. HOER
BY Thomas O. Watson Jr.

ATTORNEYS

BROAD-BAND LUMPED-ELEMENT DIRECTIONAL COUPLER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to a directional coupler and more particularly to a lumped-element directional coupler of the resistive-divider-type which has a high degree of directivity over an exceptionally wide frequency range.

A directional coupler is a device which samples a small portion of the energy of the wave which is traveling in one direction or the other through a transmission line. The coupler can be thought of as two separate parts; a circuit to sample the voltage on the line, and a current probe to sample the current on the line. These samples provide two voltages which add for current in one direction and substract for current in the opposite direction giving the coupler its directivity properties. One of the earliest directional coupler designs consisted of a capacitive-resistance voltage divider and a loop current probe. This coupler was later modified to make the coupling independent of frequency by making the inductive reactance of the loop current probe much greater than the resistance of the voltage divider combined with the resistance of the detector connected to the side-arm.

Another type of directional coupler utilizes a capacitive-voltage divider with a resistance inserted in the main transmission line. A later modification of this type of coupler does not have the resistance inserted directly into the line but has it coupled to the main line through mutual inductance. While these type of couplers have proven satisfactory they have not provided a high degree of directivity over a very wide frequency range.

The present invention overcomes these difficulties by providing a higher degree of directivity in a more efficient manner.

SUMMARY OF THE INVENTION

The purpose of this invention is to provide a directional coupler which is independent of frequency and provides a high degree of directivity over an exceptionally wide frequency range. The coupler utilizes a resistive-voltage divider because of the ease with which the impedance of all ports can be made 50 ohms. The 50 ohm impedance value permits the use of the coupler for power measurement in 50 ohm transmission line systems. The current probe is provided by a toroidal coil between the main line and the outer conductor. Capacitors in shunt with the voltage divider help tune for high directivity and make the resistive voltage divider independent of frequency by compensating for stray capacitance. The output portion of the resistive voltage divider is an adjustable potentiometer whose center wiper is connected to the toroidal coil. For coupling ratios below about 30 dB small resistors are added to the main line to keep the voltage standing wave ratio (VSWR) small. These resistors are not needed for coupling ratios above about 30 dB.

The purpose of coupling the resistive voltage divider to the main line through a capacitor is to change the phase of the sample voltage so that it is in phase with the voltage from the toroidal coil. Directivity greater than 50 dB is achieved over a wide frequency range for coupling ratios of 30, 40, and 50 dB. Greater directivity can be achieved over a narrower frequency range, and the coupler can be tuned for essentially infinite directivity at a fixed frequency. The coupler, although resistive, can pass 100, 300, or 1,000 watts for the coupling ratios of 30, 40, and 50 dB, respectively, with less than a 0.01 dB change in coupling ratios. The coupling ratios are constant with frequency to ± 0.25 dB.

OBJECTS OF THE INVENTION

It is an object of the present invention to provide a lumped element directional coupler which is able to detect the direction and amplitude of waves on a transmission line over a very wide frequency range.

It is a further object of the present invention to provide a directional coupler which has a high degree of directivity.

It is yet another object to provide a directional coupler which has the voltage ratio of the resistive voltage divider independent of frequency over a very large frequency range.

A still further object of the present invention is to provide a directional coupler in which the coupling ratio can be kept constant over a very wide frequency range.

Yet another object of the present invention is to provide a directional coupler in which the constant coupling ratio and large directivity can be maintained at high power levels.

An even further object to the present invention is to provide a directional coupler in which the voltage standing wave ratio of all ports of the coupler can be kept very small over the same large frequency range over which the coupling remains constant and the directivity large.

Other objects, advantages and novel features of the invention will become apparent from the following detailed description of the invention when considered in conjunction with the accompanying drawings.

DETAILED DESCRIPTION OF THE PREFERRED EMBODIMENT

Figures 1A, 1B:
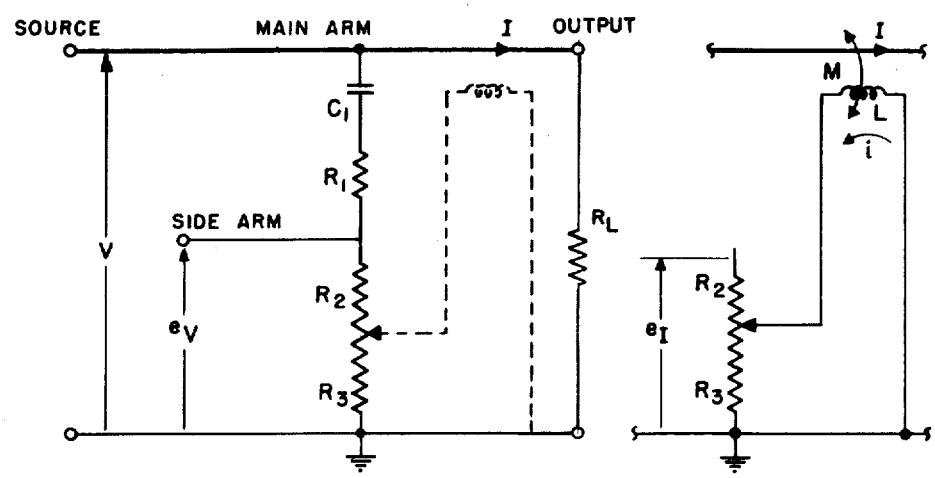
FIG. 1a is a schematic diagram illustrating the voltage sampling portion of the circuit.
FIG. 1b is a schematic diagram illustrating the current sampling portion of the circuit.

Referring now to FIG. 1a, $R_1$, $R_2$ and $R_3$ are the resistive voltage divider of the voltage sampling circuit and in FIG. 1b, L and $R_3$ is the current sampling circuit. The output from the resistive voltage divider is $e_v$ and the output from the current probe is $e_I$. The output from the coil alone with $R_1$ opened circuited (FIG. 1b) is given by:

$$e_I = iR_3 = [j\omega M I/(R_3 + L)]R_3$$

But $I=V/R_L$ so that $e_I$ becomes: where $R_L$ is the impedance of the load connected to the output port, $$e_1 = \frac{MVR_3}{LR_L[1 + (R_3/j\omega L)]} \quad (1)$$

The output from the voltage divider alone with the coil L open circuited (FIG. 1a) is given by:

$$e_v = \frac{VR_{23}}{KR_{123}[1 + (1/j\omega C_1 R_{123})]} \quad (2)$$

where $$K = 1 + C_g/C_1 \quad 3$$

Figure 2:
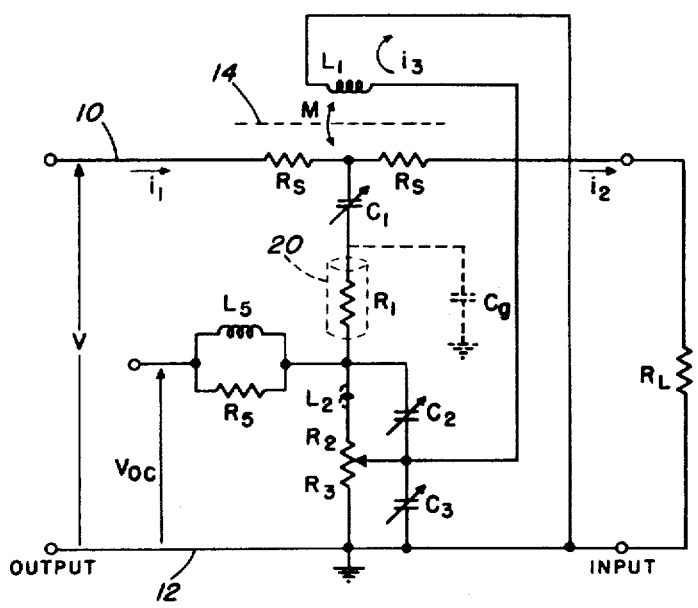
FIG. 2 illustrates the complete equivalent circuit diagram of the resistive-divider-type directional coupler.

$R_{23} = R_2 + R_3$, $R_{123} = R_1 + R_2 + R_3$ The capacitance $C_g$ of equation 3 is shown dotted in FIG. 2. For the embodiment of FIG. 3, $C_g$ is the stray capacitance to ground and is compensated for by the brass tube 20. Thus, the effective capacitance of $Cg=0$ and the factor $K$ of equation 3 reduces to 1. In the embodiment of FIG. 4, $C_g$ is the added capacitance provided by the sleeve 18 which is discussed in more detail below.

The sign on $e_I$ is plus for $R_L$ connected to the output as is shown in FIG. 1, and $e_V$ and $e_I$ add to give some desired coupled output at the side arm. To measure or calculate the directivity, $R_L$ is connected to the input port and the signal is applied to the output port as shown in FIG. 2. The equations for $e_V$ and $e_I$ will remain the same except the sign of $e_I$ will change. Then the coupled output voltage at the side arm will be $e_V - e_I$, which must be zero for infinite directivity. Comparing equation 1 and equation 2 we see that we make $e_V$ equal $e_I$ at all frequencies if $$R_{23}/KR_{123} = MR_3/LR_L \quad 4$$

and $$C_1 KR_{123} = L/R_3 \quad 5$$

With the addition of $C_1$ the conditions for infinite directivity are no longer frequency dependent and it is not necessary to satisfy the condition that $(R_3/\omega L) <<$ than 1 to have good directivity.

The coupling is defined at the ratio of incident input power to the power coupled out to a nonreflecting detector, when the main arm of the coupler is terminated by a nonreflective load. If the coupler resistances are chosen so that the impedance looking into the side-arm is $R_L$, and a nonreflecting detector of impedance $R_L$ is connected to the side-arm, the coupling is given by:

$$\text{coupling} = 20 \log_{10} KR_{123}/R_{23} \sqrt{1 + (R_3/\omega L)^2} \quad 6$$

from equation 5 it can be seen that to make the coupler independent of frequency requires that $(R_3/\omega L)^2 << 1$ 7 Note that equation 7 does not have to be satisfied for high directivity, however it is necessary to keep $R_3/\omega L$ fairly small to keep the coupling flat.

A complete equivalent circuit diagram of the coupler as it finally evolved is shown in FIG. 2. The small resistors $R_S$ are added to the center conductor to keep the main line VSWR small. They are not needed for coupling ratios above 30 dB. The capacitors $C_2$ and $C_3$ are added to help tune for high directivity. They are needed to make the resistive voltage divider independent of frequency by compensating for the stray capacitance across $R_1$. The two components $R_s$ and $L_s$ are used to make the output impedance of the side-arm 50 ohms and independent of frequency. They are necessary to compensate for $C_2$ and $C_3$. The resistors $R_2$ and $R_3$ are portions of one adjustable potentiometer whose center wiper is connected to the coil $L_1$.

In FIG. 2, 10 refers to the main line while 12 indicates the outer conductor. A shield indicated at 14 between the main line 10 and a toroidal coil $L_1$ keeps the current sampling probe independent of voltage. A brass tube 20 which is slid over $R_1$ provides compensation for stray capacitance to ground indicated by $C_g$. This brass tube 20 in conjunction with $C_2$ and $C_3$ keeps the resistive voltage divider independent of frequency. The relative size and position of the brass tube 20 necessary to give the best directivity was found experimentally.

Values for the circuit components as well as more exact equations for the coupling, directivity and impedance of each port maybe obtained by solving the circuit equations written for $i_1$, $i_2$, and $i_3$. A detailed analysis of the circuit equations for the circuit of FIG. 2 is given in an article published in the IEEE Transactions on Instrumentation and Measurement entitled Broad-Band Resistive-Divider-Type Directional Coupler by Cletus A. Hoer and David L. Agy, Volume IM-19, No. 4, Nov. 1970.

A detailed analysis indicated that coil $L_2$ was needed but experimental results indicated that it was unnecessary. In some circumstances coil $L_2$ may need to be provided.

Figure 3:
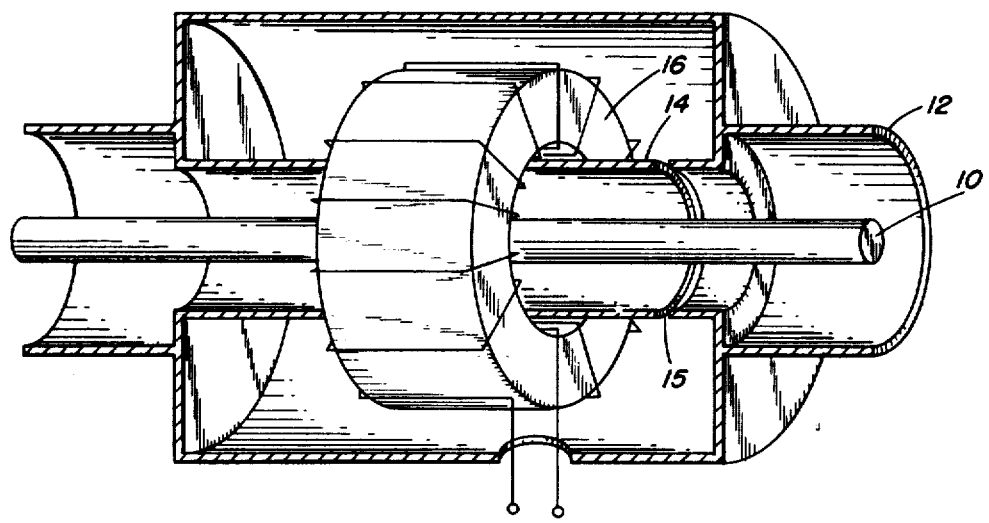
FIG. 3 is a cut-away view of the current probe.
Figure 4:
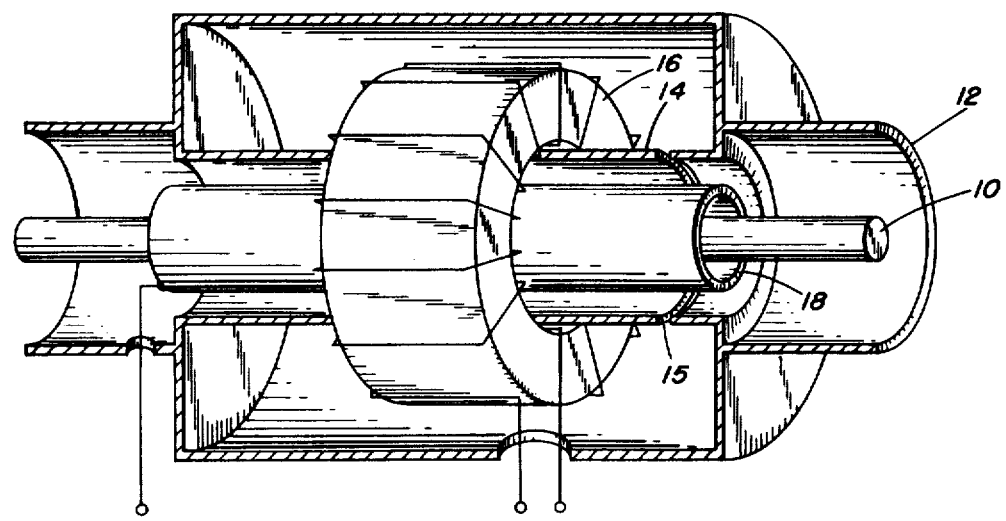
FIG. 4 is a cut-away view of the current probe with a modification to increase the frequency range and the power handling capacity of the directional coupler.

FIG. 3 is a cut-away view of a current probe for use at frequencies in the 1 to 30 MHz range. The probe is a toroidal coil 16 ($L_1$ in FIG. 2) which fits between the center conductor 10, i.e. the main line, and the outer conductor 12 of the transmission line. The toroidal coil 16 is shielded from the inner conductor 10 by an extension of the outer conductor shown at 14 which provides a grounded electrostatic shield to eliminate capacitance from the inner conductor to the coil. A small gap 15 prevents the outer conductor current from flowing down this tube and by-passing the coil. The self inductance of this type of winding is:

$$L_1 = \mu N^2 L_a \quad 8$$

where: $N$=number of turns
$\mu$=relative permeability of the core
$L_a$ = geometric inductance = 0.002H ln OD/ID, in microhenries
$H$=core height in centimeters
$OD$=core outside diameter
$ID$=core inside diameter If the axis of the toroidal coil concides with the axis of the center conductor, the mutual inductance between the center conductor and $L_1$ is:

$$M = \mu N L_a \quad 9$$

Note that $L/M = N$. This simplifies the directivity equations since it is the ratio of $L/M$ that appears in the equation.

The main line VSWR can be kept small by keeping the ratio of the transmission line capacitance and inductance per unit length constant through this region, and by adding resistance to the center conductor. The resistors $R_s$ are small value resistors which can be added to the center conductor to compensate for the loading effective of the resistive voltage divider. Close estimates for the value of $R_s$ needed to make the input to output impedance equal 50 ohms may be obtained from:

$$R_s + j\omega L_s = R^2_L/2R_{123} + j\omega L_1/2N^2 \qquad 10$$

The $L_s$ in this equation is the added inductance provided by choosing the diameter of the center conductor and outer conductor so that the ratio of inductance to capacitance is constant throughout this region.

The value of potentiometer $R_{23}$ needed to make the side-arm output impedance equal to $R_L$ may be obtained from the approximation:

$$R_{23} \cong R_L(1 + 2R_L/2R_1 + R_s - R_L) \qquad 11$$

The capacitors $C_2$ and $C_3$ make the output impedance of the side-arm look like a resistance of value $R_L$ in parallel with a capacitance. This effective parallel capacitance (call it $C_p$) can be compensated for by providing a resistor $R_5$ of value $R_L$ in parallel with an inductance $L_5$ chosen so that the time constants are equal; that is, $$L_5/R_5 = L_s/R_L = R_L C_p. \qquad 12$$

Figure 5:
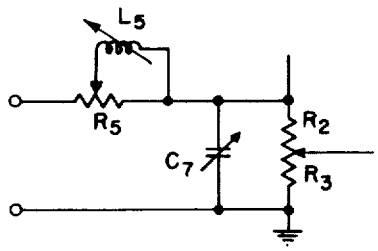
FIG. 5 is a schematic of the side-arm with a modification to more readily achieve a 50 ohm side-arm impedance.

In practice it is often advantageous to have $R_5$ and $L_5$ adjustable. $R_5$ is first adjusted to provide the proper impedance. The side-arm impedance is then equal to $R_L$ and is independent of frequency to a first approximation. A further modification to the side-arm is shown in FIG. 5. When it is difficult to make the side-arm impedance equal to $R_L$ by adjusting $L_5$ and adjustable capacitor $C_7$ may be added. The capacitor is part of $C_p$ and simplifies the adjustments needed to make the side-arm impedance equal $R_L$.

The insertion loss of the coupler when placed in a nonreflecting system can be calculated approximately by assuming the coupler is a symmetrical T attenuator whose arms have value $R_S$ and whose leg has the value $R_{123}$. The attenuation of a symmetrical T attenuator is given by $$A = 20 \log_{10}(1 + 2R_S/R_L - R_S) \text{ dB}. \qquad 13$$

Results from three couplers designed according to FIG. 3 having coupling ratios of 30, 40 and 50 dB showed directivity greater than 50 dB over a 1 to 30 MHz frequency range. The current probe for the 30 dB coupler consisted of 11 turns of number 20 wire on ferrite cores of $\mu = 125$ to give $L_1 = 55\mu$ H. The current probe for the 40 dB coupler consisted of 11 turns of number 20 wire on powdered iron cores of $\mu = 8$ to give $L_1 = 4.0 \mu$ H. For the 50 dB coupler the current probe consisted of 20 turns of number 20 wire on a plastic core to give $L_1 = 5 \mu$ H. In each of these couplers, $R_S$ was not added ($R_S = 0$) since the main line VSWR is low enough for these high coupling ratios to make it unnecessary to add $R_S$ for our applications. Also, sufficiently high directivity was obtained without the addition of $L_2$. In each coupler, $R_{23}$ is a 50 ohm cermet potentiometer whose center tab is connected to the output of coil $L_1$. The capacitors $C_1$, $C_2$ and $C_3$ are miniature variable ceramic disk capacitors. $R_1$ is made up of six one watt thin-film resistors which were chosen so that 3 watts could be dissipated easily. This allows 1,000 watts to pass through the 50 dB coupler, 300 watts through 40 dB one, and 100 watts through the 30 dB coupler. By using resistors in $R_1$, which have a temperature coefficient of $\pm$ 25 ppm, the change in coupling ratio at these power levels was less than 0.2 percent (0.01 dB) for all couplers.

FIG. 4 shows another embodiment which extends the useful frequency range up to 400 MHz and the power handling capacity up to 50,000 watts below 30 MHz. In this embodiment the capacitors $C_1$ and $C_a$ are obtained with a sleeve 18 between center conductor 10 and outer conductor 12. In the construction of this embodiment a brass sleeve was used and was held in place by a teflon spacer which is the dielectric for $C_a$. The circuit design is essentially the same as before, however $C_1$ and $C_a$ must now be distributed capacitors, and the outer conductor of the transmission line must be carefully designed to keep the characteristic impedance of the transmission line constant through the coupler. To keep the main line VSWR small, it is necessary to increase the inductance per unit length of the transmission line to compensate for the increased capacitance per unit length throughout the length of the capacitor sleeve. In this embodiment $C_1$ is now the capacitance from the sleeve 18 to the center conductor 10 and $C_a$ is an added capacitance from the sleeve 18 to the shield 14.

From this modification a 50 dB coupler which has a useful frequency range of 5 to 400 MHz at power levels up to 1,000 watts was constructed. The directivity of this coupler is greater than 36 dB from 30 to 400 MHz and the coupling $50 \pm 0.5$dB over this same frequency range. Below 30 MHz the directivity is still greater than 30 dB down to 5 MHz where the coupling increased to 53 dB. A 60 dB coupler was produced which has a frequency range of 1 to 32 MHz at power levels up to 50,000 watts. The directivity of this coupler was greater than 42 dB and the coupling is $60 \pm 0.5$dB from 2 to 32 MHz.

To make the directivity adjustment, a swept frequency signal is applied to the main line output port of the coupler with the input port terminated in a nonreflecting load. A 50 ohm detector is connected to the side-arm and the resultant signal is displayed on an oscilloscope. First, the low-frequency portion of the signal is minimized by adjusting R3 (and $R_2$) and $C_1$. Then the high-frequency portion of this signal is minimized by adjusting C2, C3 and the distributed capacitance across $R_1$. This distributed capacitance is adjusted by sliding a brass tube over $R_1$. The purpose of this tube is to increase the distributed capacitance across $R_1$ to compensate for the stray capacitance $C_a$ from $R_1$ to ground. This distributed variable capacitor was found necessary to obtain directivity greater than 30 dB. The relative size and position of the tubing necessary to give the best directivity was found experimentally.

After the adjustments are made to obtain the best directivity, the impedance of the side-arm is made 50 ohms by adjusting $L_5$ and if necessary $C_7$. With a 50 ohm load connected to the input port as well as one connected to the output port, a vector impedance meter was connected to the side-arm. An inductance of about 0.1μ H for $L_s$ across $R_s$ = 50 ohms was found necessary to make the side-arm impedance 50 ohms, independent of frequency. The VSWR of the side-arm as well as of the main line are all less than 1.04.

The coupler disclosed for use in the 1–30 MHz frequency range, can also be used from 50 kHz to 50 MHz. Below 1 MHz the coupling ratio increases with frequency but the directivity remains greater than 30 dB to 50 kHz. Above 30 MHz the coupling remains constant to about 50 MHz but the directivity falls to about 30 dB.

Thus there has been disclosed a broad-band lumped element directional coupler which is useful over an extremely wide frequency range and high power levels. Obviously many modifications and variations of the present invention are possible in the light of the above teachings.

What is claimed is:

1. A broad-band directional coupler comprising:
   a transmission line having a center conductor and an outer conductor;
   a resistive voltage divider comprising first and second resistances in series for sampling the voltage on the transmission line, the second resistance being connected to the outer conductor;
   a capacitance in series with the resistive voltage divider connecting the voltage divider to the center conductor;
   means electrically connected to the second resistance and physically disposed between the center conductor and the outer conductor for sampling the current on the transmission line; and,
   means for making the impedance of the resistive voltage divider substantially independent of frequency, said means including a metal tube at least partially surrounding the first resistance and a capacitor connected in parallel with the second resistance.

2. The directional coupler of claim 1 wherein the metal tube is a brass tube.

3. The directional coupler of claim 1 wherein:
   said second resistance of the resistive voltage divider is a potentiometer;
   said current sampling means is a toroidal coil; and
   said toroidal coil is connected to the wiper of the potentiometer.

4. The directional coupler of claim 3 further comprising:
   a shield between the toroidal coil and the center conductor whereby the current sampling means is maintained independent of voltage.

5. The directional coupler of claim 4 wherein the capacitance connecting the resistive voltage divider to the center conductor is provided by a brass sleeve between the center conductor and the shield.

6. The directional coupler of claim 5 wherein resistances are added to the center conductor to maintain the voltage standing wave ratio less than about 1.04.

7. The directional coupler of claim 5 wherein the ratio of the inductance to the capacitance of the transmission line is kept constant throughout the region of the current sampling means.

8. The directional coupler of claim 6 wherein the voltage across the second resistance comprises the coupled output, and further including an inductance connected in parallel with a resistance at the coupled output whereby the coupled output impedance can be made equal to the impedance of a load and substantially independent of frequency.

9. The directional coupler of claim 8 further including an adjustable capacitor in the coupled output connected in parallel with the potentiometer of the resistive voltage divider whereby the impedance of the coupled output may be more readily made equal to the impedance of a load.

10. The directional coupler of claim 8 wherein the inductance is variable.

* * * * *